Dec. 2, 1930. T. C. LENNOX 1,783,804
ELECTRIC SYSTEM
Filed March 15, 1929 5 Sheets-Sheet 5

Inventor:
Thomas. C. Lennox,
by Charles E. Fuller
His Attorney.

Patented Dec. 2, 1930

1,783,804

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

ELECTRIC SYSTEM

Application filed March 15, 1929. Serial No. 347,399.

My invention relates to electric systems wherein power is transmitted between alternating and direct current circuits by means of space discharge devices, such as mercury arc rectifiers for example, and has for its principal object the provision of means whereby the voltage of the direct current circuit may be maintained substantially constant over a wide range of loads.

One of the problems involved in the design of mercury arc rectifying systems is to maintain the direct current output voltage of the rectifiers substantially constant between no load and full load, so that these may be operated in parallel with regulated dynamo electric machines. Attempts to solve this problem have resulted in the use of interphase transformers, the cores of which are saturated in accordance with the direct current load. This method has not been altogether satisfactory because difficulty is encountered in maintaining the voltage constant over the load range, and because the power factor of the apparatus is low.

In accordance with my invention this difficulty is overcome by the provision of a rectifying system in which direct current voltage regulation is obtained by the provision of an interphase system containing predetermined inductive and capacitive impedances arranged to vary the effective impedance of the interphase system in inverse proportion to the D. C. load.

My invention will be better understood from the following description when considered in connection with the accompanying drawings and its scope will be pointed out in the appended claims.

Figure 1:
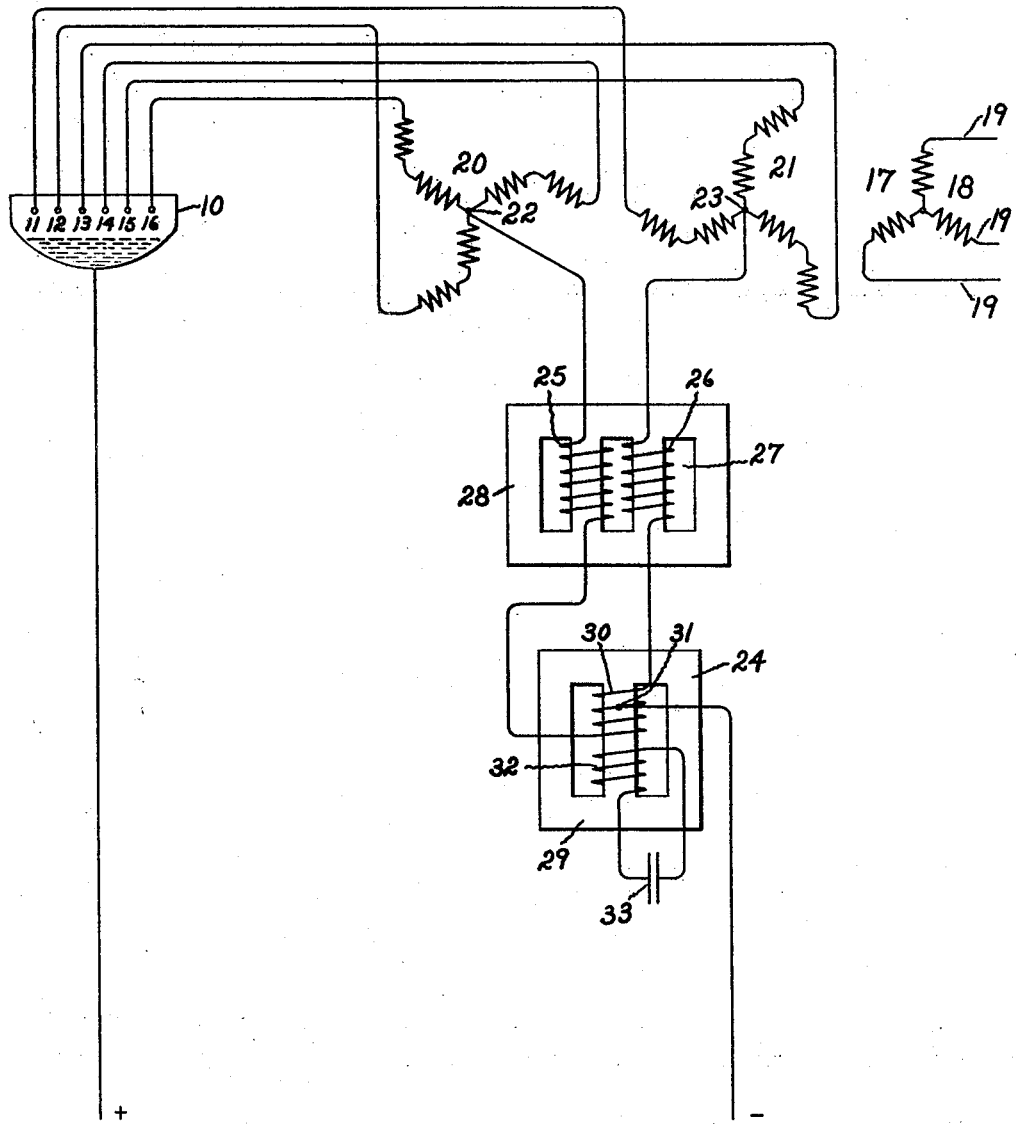
Figure 2:
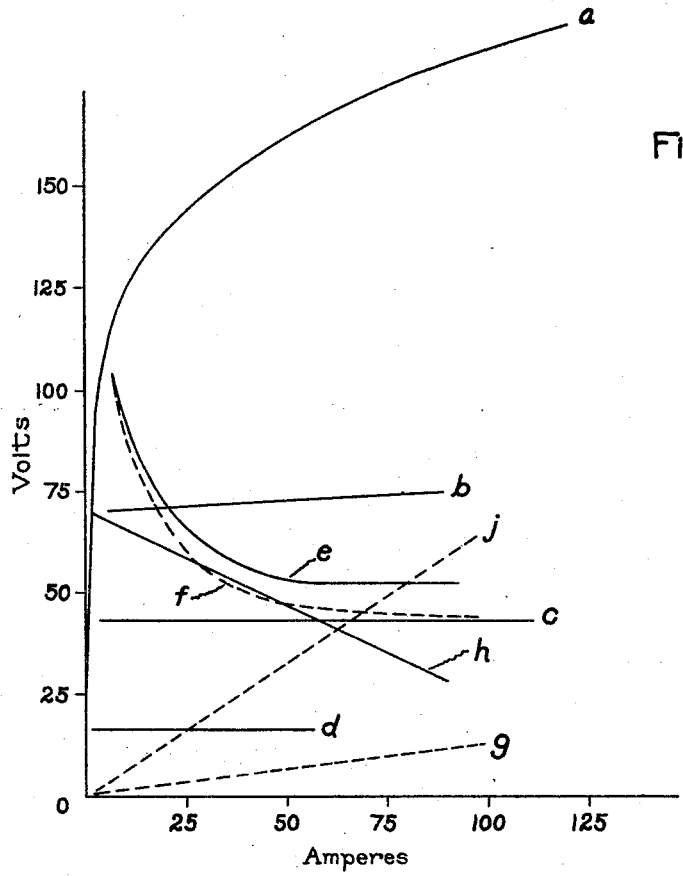
Figure 3:
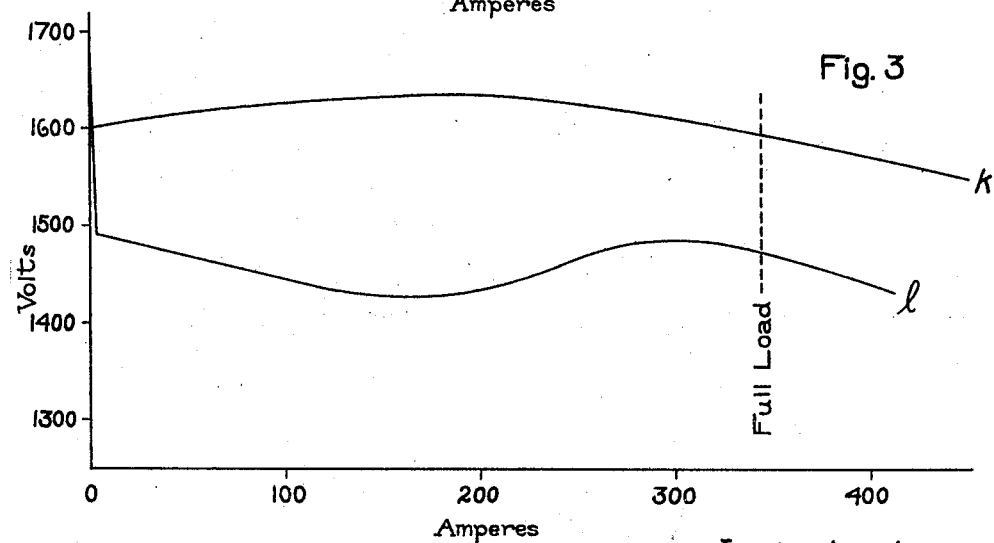
Figure 4:
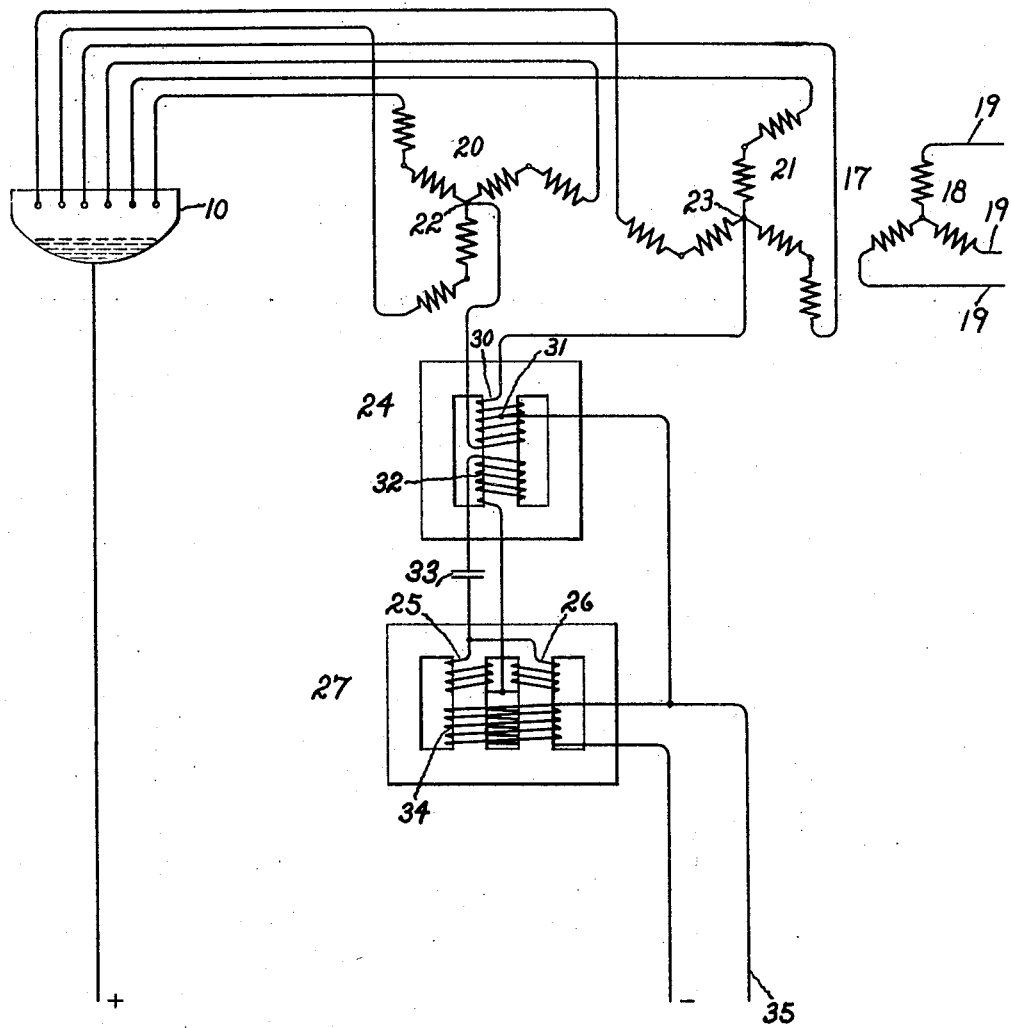
Figure 5:
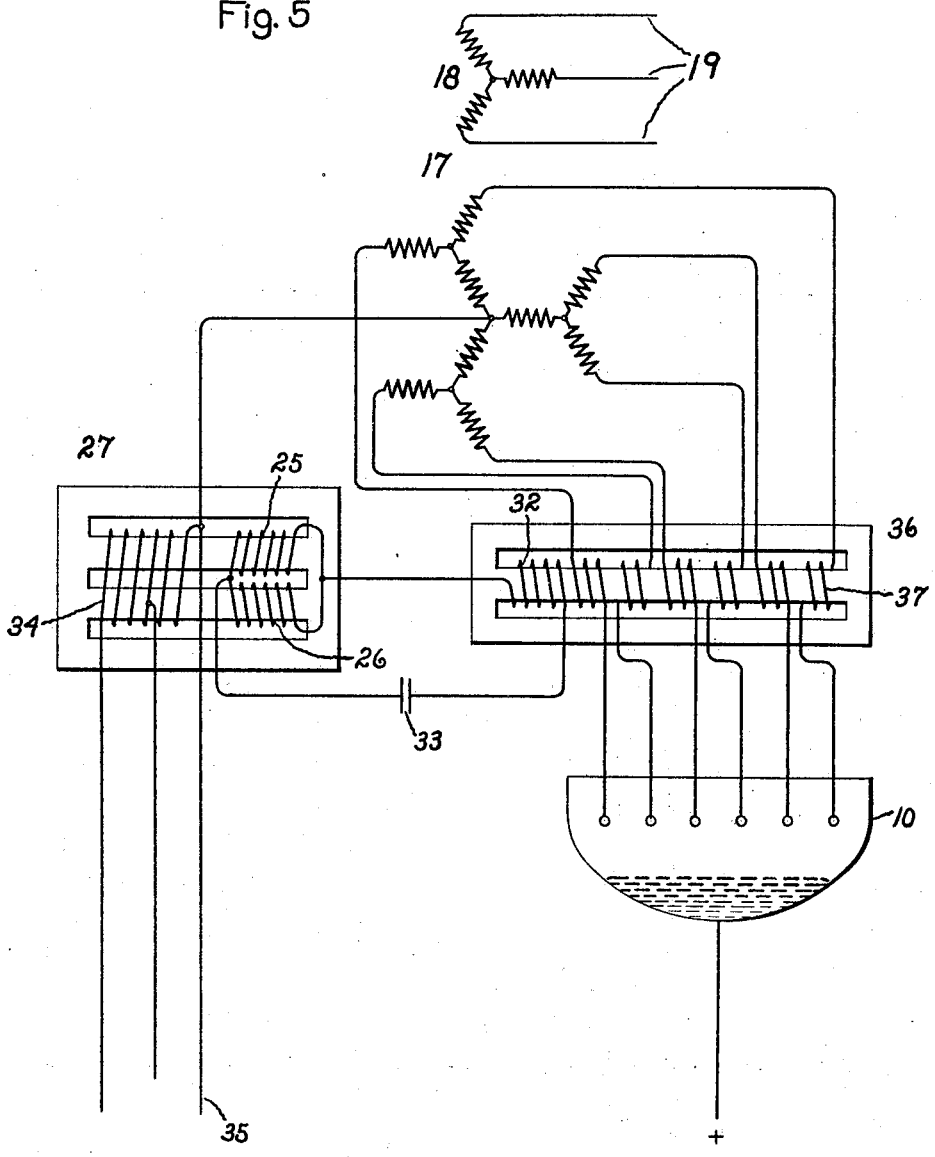
Figure 6:
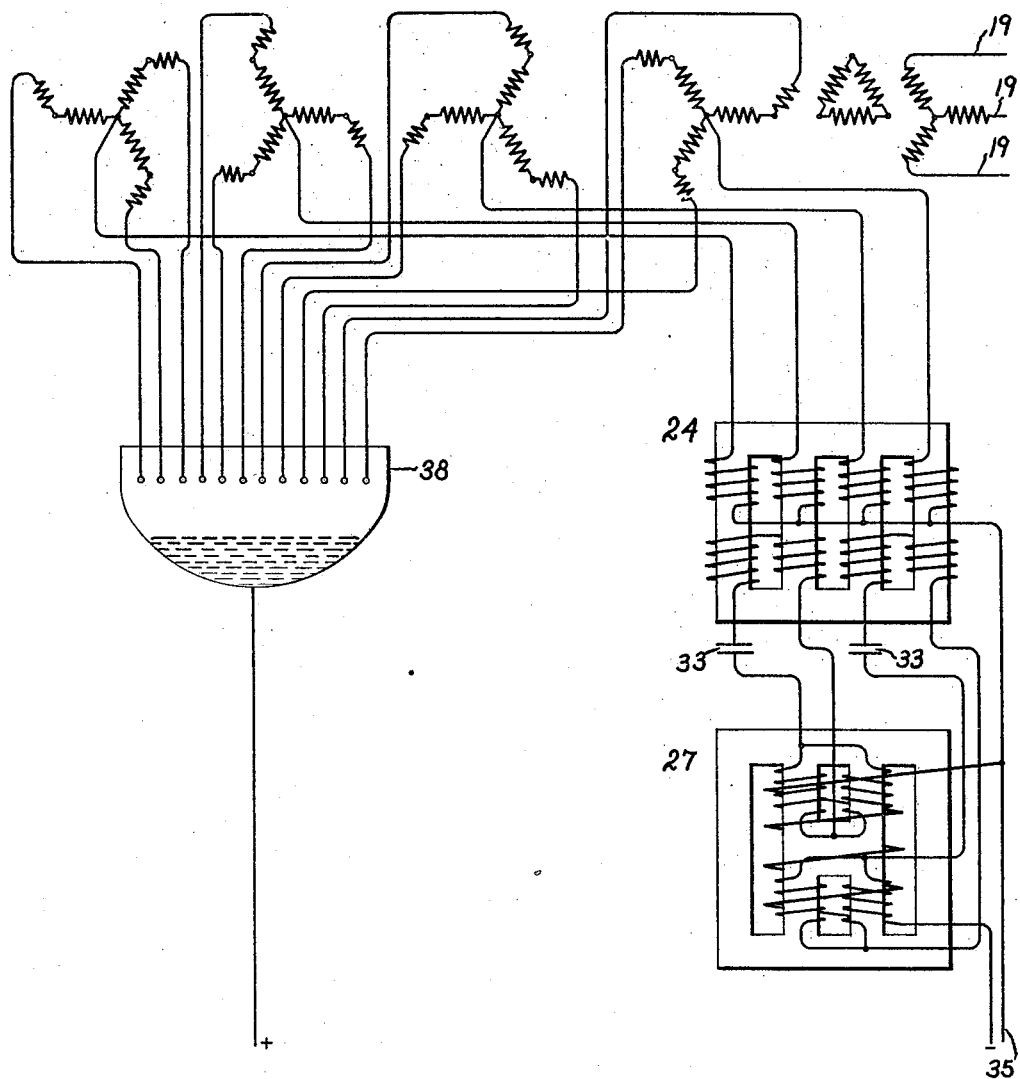

Referring to the drawings, Fig. 1 illustrates diagrammatically a six phase mercury arc rectifier system incorporating my invention in its simplest form; Figs. 2 and 3 illustrate characteristic curves which facilitate the explanation of the invention; and Figs. 4, 5 and 6 illustrate modifications thereof.

Fig. 1 illustrates a mercury arc rectifier 10, provided with anodes 11–16 inclusive, which are respectively connected to the secondary phases of a transformer 17. This transformer includes a primary winding 18 connected to supply terminals 19, and a secondary winding comprising two Y-connected groups 20 and 21, provided with neutral terminals 22 and 23. These neutral terminals are interconnected through an auxiliary transformer 24 and the windings 25 and 26 of a reactor 27. The reactor windings are respectively connected between the auxiliary transformer winding 30 and the neutral terminals, and are respectively wound on the middle two legs of a four legged core 28.

The transformer 24 includes a three legged core 29 and a primary winding 30 wound on the middle leg thereof. The mid-tap 31 of this winding is the negative terminal of the direct current circuit, and the end terminals are respectively connected to the windings 25 and 26. In accordance with my invention the transformer 24 is provided with a secondary winding which is closed through a condenser 33 and is arranged to produce a leading voltage, in the interphase system, which is directly proportional to the D. C. load.

The operation of the above arrangement is as follows: The six phase transformer being connected to the six anodes tends to result in the direct current being drawn in turn from each anode so that each of the six windings are active for at least 60 electrical degrees of the supply voltage cycle. The secondary phases are so arranged that current will flow alternately from the terminals 22 and 23 and an A. C. having a frequency triple that of the supply current will thereby be impressed upon the interphase system including the reactor 27, auxiliary transformer 24 and condenser 33. It is therefore evident that the current in transferring from anode to anode in the six phase rectifier does so against the impedance not only of the main transformer coils but also that of the interphase system. Since an increase in this impedance to current transfer, or commutation, results in a lower output voltage, it is obvious that a measure of voltage control may be obtained thereby. This measure of regulation exists between an upper limit at which the rectifier operates at six phase voltage with a minimum of impedance to commutation, and obtainable by substantially neutralizing the reactance of the interphase system, and a lower limit at which the rectifier operates at double three phase voltage, obtainable by increasing the impedance of the interphase system to a value at which the continuous exciting current flowing in the interphase transformer reaches its maximum possible value.

The interphase system consisting of the reactor 27, transformer 24 and condenser 33, is arranged to give such a variation of impedance that the voltage of the rectifier under increasing load will rise and thereby flat-compound or over-compound as desired. It will be understood by those skilled in the art that the direct currents flowing from terminals 22 and 23 will flow through the coils 25 and 26 respectively of the reactor 27, and that these currents will induce unidirectional fluxes in the core 28, which may exist in the magnetic circuit including the outside legs of the core. These unidirectional fluxes will reach high values because of the relatively large direct current flowing, and by saturating the core will reduce the reactance voltage which results from the flow of the alternating current component. Thus the reactance obtained from reactor 27 may be made variable, and if desired, to decrease as the load increases. At the same time the condenser 33 causes the existence of a voltage increasing in proportion to the load and also tending to oppose the flow of alternating current but having a phase position nearly 90 degrees in advance of the current. As the reactance voltage from reactor 27 will have a phase position nearly 90 degrees lagging the current, the result is that these two voltages will be very nearly opposite in phase, and the total voltage opposing the flow of alternating current between 22 and 23 will be substantially equal to the difference between the lagging voltage of 27 and the leading voltage of 33. By properly adjusting the constants of the interphase system, this resultant voltage may be made to vary in such manner as to cause an increase in the direct current output voltage under load.

In order to better understand the operation of this device, reference is made to Fig. 2 wherein the abscissæ represent different values of interphase current and the ordinates represent the voltage drop of the reactor 27. The curves $a$, $b$, $c$ and $d$ in this figure indicate the voltage which will be generated in this circuit simultaneously with a direct current excitation when the two currents, alternating and direct, have a constant proportion to each other. Curve $a$ represents the voltage drop of the reactor 27 when the direct current is zero and is therefore the exciting current curve for the reactor core alone. This applies to a reactor without air gaps. Curve $c$ shows the voltage drop which will be that of the reactor 27 when the direct current excitation is at all times equal in ampere turns to the alternating current excitation, that is, the currents increase and decrease at the same rate and curve $d$ illustrates the voltage which may be obtained if the D. C. is twice that of the A. C. at all times.

It may be observed that, with the exception of that range of densities which approach A. C. saturation, a reactor under this condition gives substantially a constant voltage throughout its range of load. It might be expected that the increase of direct current excitation would cause a great decrease in the reactance of the device with a consequent decrease in voltage. However, it must be remembered that the A. C. current is increasing at the same rate as the D. C. excitation so that the decrease in reactance is completely compensated for by the increase in alternating current and it so happens that these two effects about neutralize each other so that a constant voltage is obtained. The curves shown on this sheet are plotted from actual tests on such a reactor. Consideration of these curves will show that a saturated reactor without air gap is not alone sufficient to cause compounding of a rectifier, that is, the decrease in the reactance in the reactor due to saturation will be only sufficient to compensate for the increase in current in the reactor giving a constant reactive voltage so that the D. C. voltage will still fall off due to the resistance and reactance of the main transformer and of the other parts of the circuit.

It has been proposed to place air gaps in the reactor magnetic circuit which carries the unidirectional or saturating flux. These air gaps tend to reduce the effect of the D. C. excitation at light loads but have comparatively little effect on it at heavy loads as the whole magnetic circuit is then saturated and has a reluctance high in proportion to that of the air gaps. Curves $e$, $f$ and $g$ in Fig. 2 illustrate this. Assuming that the maximum voltage which can exist between neutrals 22 and 23 of the main transformer, that is, the interphase voltage obtained when operating double three phase, has a value of 75 on the voltage scale of this sketch and that sufficient direct current excitation is furnished to the reactor by means of the D. C. load current to reduce this voltage to a value of approximately 40, that is, about on the line $c$. Then if no air gaps are provided, the direct current load will cause the interphase voltage to fall from 75 to 40 and stay approximately there throughout the whole range of load and the rectifier will consequently work between double three phase and six phase with a voltage regulation which will also be between the three phase and six phase regulation. If now an air gap is added to the reactor as described, the voltage obtained from it will be changed to approximately that shown on curve $f$ giving a high direct current voltage at light loads and very little higher than before at heavy loads. This voltage will be effective between the neutrals of the main transformer. The total voltage opposing the flow of triple frequency current between these neutrals will also include the reactance voltage resulting from leakage fluxes in the main transformer. This is shown at $g$ and increases directly with the load. The total voltage opposing the flow of triple frequency current is therefore $g$ plus $f$ and is shown at $e$.

It will be observed that the voltage $e$ is higher than the maximum required interphase voltage 75 up to 25 amperes load. That between 25 and 50 amperes load it decreases rapidly and that beyond 50 amperes it varies little and that beyond 100 amperes it will begin to increase due to the increase of $g$. The result of this will be that the rectifier will work double three phase up to 25 amperes load as full interphase voltage can exist up to then. Between 25 and 50 amperes it will tend to change from double three phase toward six phase operation, thus resulting in an increase in output voltage. Beyond 50 it will continue working between three phase and six phase with a voltage drop in load similar to that when working three phase or six phase. Fig. 3 shows on the lower curve $l$ the direct current voltage as determined by actual tests on such a system. It will be observed that, up to 150 amperes load, the device was working substantially double three phase, that between 150 amperes and 300 amperes load there was an increase in voltage as the saturation of the reactor became effective, and that beyond 300 amperes the voltage fell off at about the same rate as at light loads. This sort of curve is typical of this method of compounding for the reasons outlined and it is difficult to obtain satisfactory compounding by this means, regardless of the flux densities in the reactor core.

Curves $b$, $h$, $j$ and $g$ of Fig. 2 illustrate in a similar manner the operation of the condenser compounding. As previously explained, curve $g$ is the reactance voltage generated in the main transformer 17 and curve $b$ is the voltage generated in the reactor 27. The leading voltage of the condenser is indicated by the curve $j$. The reactor voltage plus the impedance voltage of the transformer 17 minus the voltage of the condenser 33 is therefore substantially the total voltage impeding the flow of triple frequency current. This is shown as $h$. It will be observed that this interphase circuit voltage drop decreases as the direct current load increases so that a continual and gradual increase of the direct current circuit voltage under load is obtained. This increase may be made sufficient to give substantially flat compounding.

It must be borne in mind that if the condenser voltage $j$ is made larger than the reactor voltage $b$ plus the main transformer impedance voltage $g$ that a net leading voltage in the interphase circuit will result. This will not give a further rise of output voltage but rather a tendency to decrease it. The maximum voltage that can therefore be obtained from the equipment is substantially that which will result when voltage $h$ reaches zero. This condition is the equivalent of a six phase rectifier in which no reactance exists in the circuit through which the triple frequency currents are required to flow.

In Fig. 3 the curve $k$ indicates the results obtained with the condenser method of compounding. It will be observed that a gradual increase of voltage is obtained starting practically at zero load, continuing to increase up to a certain point and then falling off again. This sort of curve being similar to that obtained from a compound wound generator or synchronous converter is highly desirable for a rectifier particularly when it has to run in parallel with existing machinery. It will be understood that the voltage has a value between the double three phase and the six phase voltage of the rectifier. For instance, in the case shown, six phase voltage at no load has a value of 1720 and double three phase at a value of 1490, whereas the flat compounding was obtained at a value of 1600 volts. This is done by making the voltage of the reactor, which is shown in Fig. 2 at curve $l$ in the above example, have a value less than is required for double three phase operation. If the condenser used in obtaining this upper curve in Fig. 2 were short circuited the result would be a voltage of approximately 1600 at no load, or at least at very light load, falling off under load at about the same rate as the lower curve falls off up to 150 amperes. By selecting the core, number of turns, and ratio of A. C. to D. C. in the reactor to suit, the origin of the condenser compound curve can be placed anywhere between the double three phase and six phase origins. However, at full load the condenser compounding equipment cannot be expected to give a voltage appreciably higher than would be obtained with the same equipment operating six phase and having perfect interlacing of the main transformer secondary. The regulation obtainable for such a main transformer can be predetermined and thereby the maximum full load voltage that can be obtained is also determined. It is a simple matter therefore to adjust the reactor to give this no load voltage and then to adjust the condenser for flat compounding from one to the other.

Referring to Fig. 3 the rectifier is working six phase at full load in the case of the air gap compounding, that is, it is working six phase with a considerable degree of overlapping of anode currents. However, the power factor of the input current into a rectifier without a capacitor is a function of the degree of overlapping of these currents as is also the relation of full load voltage to the ideal six phase no load voltage. As the air gap compounding must have a full load voltage approximately equal to the double three phase no load voltage, it must have a high degree of overlapping and will consequently have a poor power factor. With condenser compounding on the other hand the current is advanced in phase by the action of the condenser so that the rectifier has a full load voltage as high as that of a six-phase rectifier of good characteristic and a high power factor. It should be observed that whereas these two curves are obtained from the same main transformer and for the same output current, the condenser compounding results in a much higher output voltage, and consequently a greater power output. The condenser compounding therefore makes a more economical use of the transformer material. It should also be observed that the maximum reactor voltage is much less than in the case of air gap compounding and that as shown in Fig. 2 proportionately less D. C. excitation is required. Thus the reactor is considerably smaller and cheaper. On the other hand, there is only the additional cost and energy loss in the transformer 24 and condenser 33.

Fig. 4 illustrates a modification of the invention. Here the transformer 24 is placed between the main transformer and the reactor and the condenser 33 is placed between the transformer 24 and the reactor 27. The saturation of the reactor is now obtained by a separate coil 34 through which the D. C. load current is allowed to pass. This makes possible the use of an equalizer connection 35 to facilitate paralleling such equipments. The advantage of this arrangement however is that in addition to the provision of an equalizer that the vector sum only of the condenser voltage and reactor voltage is applied to transformer 24 and as the reactor voltage is lagging and the condenser voltage leading, these subtract so that the voltage in the transformer 24 is substantially their difference, neglecting harmonic voltages which do not subtract due to non-sinusoidal form, whereas in the previous arrangement the transformer had to carry the whole condenser voltage. This decreases the size of the transformer but at the expense of an increase in the size of the reactor as the separate D. C. coil 34 will require considerably more copper than would be added to the A. C. coils by the necessity of passing the D. C. component of current.

Fig. 5 illustrates a modification of my invention in which the secondary windings of the main transformer 17 are directly connected to a common point. An auxiliary transformer 36 is used in this arrangement, containing a primary winding made up of series coils 37 in each of the anode leads, and a secondary winding 32 which is connected in series with condenser 33 across the reactor coils 25 and 26 which are in parallel. The saturation of the reactor 27 is obtained as in Fig. 4 by means of the coil 34.

Fig. 6 illustrates the invention as applied to a twelve phase rectifier 38. Here the operation is the same as in Figs. 1 and 4 except that the transformer 24 is arranged to operate as an interphase transformer in addition to its functions previously described. Such twelve phase rectifiers require an interphase transformer between the two six phase systems which make up the twelve phase system. This feature is incorporated in transformer 24 by providing the middle yoke of the core as shown which permits the six times frequency flux to pass down the two left hand legs and up the right hand legs and vice versa, generating a suitable voltage in each coil.

My invention is susceptible of being modified to meet many different operating conditions and I therefore aim to cover by the appended claims all modifications within the true spirit and scope thereof.

What I claim as new and desire to secure by Letters Patent of the United States, is:

1. The combination of a polyphase transformer, a direct current circuit, a space discharge device interposed between said transformer and said circuit, and an interphase system including a reactor connected between said polyphase transformer and said circuit, and means operable to regulate the reactance drop of said reactor in response to the alternating component of the current of said interphase system.

2. The combination of a polyphase transformer, a direct current circuit, a vapor electric device interposed between said transformer and said circuit, and an interphase system including a reactor connected between said polyphase transformer and said circuit, an auxiliary transformer arranged to be subjected to a voltage dependent on the load of said circuit and interconnected with said reactor, and means associated with said transformer for regulating the reactance drop of said reactor in response to change in said voltage.

3. The combination of a polyphase transformer, a direct current circuit, a vapor electric device interposed between said transformer and said circuit, and an interphase system including a reactor connected between said polyphase transformer and said circuit, an auxiliary transformer arranged to produce an effect dependent on the load of said circuit, and means including a condenser arranged to vary the reactance voltage drop of said reactor in response to said effect.

4. The combination of a transformer including a plurality of polyphase secondary windings each provided with a neutral terminal, a direct current circuit, a rectifier connected between said windings and said circuit, a reactor connected between said neutral terminals, an auxiliary transformer arranged to produce an effect dependent on the current of said circuit, and means operable in response to said current for neutralizing the effect of said current on the reactive drop of said reactor.

5. The combination of alternating and direct current circuits, a polyphase transformer and a mercury arc rectifier arranged to transmit power between said circuits, and an interphase system including means connected in circuit with said direct current circuit for producing lagging and leading voltages which tend to cancel each other.

6. The combination of alternating and direct current circuits, a polyphase transformer and a mercury arc rectifier arranged to translate power between said circuits, and an interphase system including reactors, a common core therefor arranged to become saturated at a predetermined load on said rectifier, and an auxiliary transformer including a primary connected in series with said reactors and a secondary winding connected to opposite terminals of a condenser.

7. The combination of alternating and direct current circuits, a polyphase transformer and a mercury arc rectifier arranged to translate power between said circuits, and an interphase system including a reactor and a condenser arranged to produce a predetermined and substantially constant voltage over the full range of load on said rectifier.

8. The combination of alternating and direct current circuits, a polyphase transformer and a mercury arc rectifier arranged to translate power between said circuits, and an interphase system including a transformer, a condenser connected thereto and designed to produce a variable leading voltage in accordance with the load of said rectifier and a reactor arranged to generate a substantially constant lagging voltage independent of the load on said rectifier.

In witness whereof, I have hereto set my hand this 12th day of March, 1929.

THOMAS C. LENNOX.